US009197481B2

(12) United States Patent
Zeng et al.

(10) Patent No.: US 9,197,481 B2
(45) Date of Patent: Nov. 24, 2015

(54) CLOUD-BASED TRANSLATION METHOD AND SYSTEM FOR MOBILE CLIENT

(71) Applicant: TENCENT TECHNOLOGY (SHENZHEN) COMPANY LIMITED, Shenzhen (CN)

(72) Inventors: Liang Zeng, Shenzhen (CN); Ming He, Shenzhen (CN); Lei Chen, Shenzhen (CN); Can Shen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 224 days.

(21) Appl. No.: 14/011,087

(22) Filed: Aug. 27, 2013

(65) Prior Publication Data

US 2014/0019526 A1  Jan. 16, 2014

Related U.S. Application Data

(63) Continuation of application No. PCT/CN2013/078949, filed on Jul. 6, 2013.

(30) Foreign Application Priority Data

Jul. 10, 2012  (CN) .......................... 2012 1 0237444

(51) Int. Cl.
G06F 15/16      (2006.01)
H04L 29/06     (2006.01)
G06F 17/28     (2006.01)

(52) U.S. Cl.
CPC ........ H04L 29/06047 (2013.01); G06F 17/289 (2013.01)

(58) Field of Classification Search
CPC ............ G06F 17/289; H04L 29/06047; H04L 67/2823

USPC ................... 709/203, 246, 223–224; 704/1, 4
See application file for complete search history.

(56) References Cited

U.S. PATENT DOCUMENTS 8,635,059 B2 *  1/2014  Estelle .................. G06F 17/277
                                                            704/2
8,706,644 B1 *  4/2014  Jesensky et al. ................ 705/74
(Continued)

FOREIGN PATENT DOCUMENTS

CN       101013422 A      8/2007
CN       101325609 A      12/2008

OTHER PUBLICATIONS

The World Intellectual Property Organization (WIPO) International Search Report for PCT/CN2013/076949 Oct. 17, 2013.

*Primary Examiner* — Oanh Duong
(74) *Attorney, Agent, or Firm* — Anova Law Group, PLLC

(57) ABSTRACT

A cloud-based translation method for a mobile client is provided. The mobile client receives a translation instruction and sends translation request information to a cloud server based on the translation instruction, where the translation request information includes text information and translation type information. The mobile client receives a translation result returned from the cloud server. When the cloud server detects that the mobile terminal logins to an account, and a cloud glossary of the account contains a word entry corresponding to the text information, the cloud server returns the translation result in the cloud glossary. When the cloud server detects that the mobile terminal does not login to the account, or when the cloud server detects that the mobile terminal logins to the account but the cloud glossary does not contain the word entry corresponding to the text information, the cloud server translates the text information.

22 Claims, 5 Drawing Sheets

(56) References Cited

U.S. PATENT DOCUMENTS

| | | | | |
|---|---|---|---|---|
| 8,983,825 B2* | 3/2015 | Sarr | ................. | G06F 17/289 704/10 |
| 2002/0007382 A1 | 1/2002 | Nojima et al. | | |
| 2002/0123878 A1 | 9/2002 | Menke | | |
| 2003/0120478 A1* | 6/2003 | Palmquist | ................. | 704/3 |
| 2004/0044517 A1* | 3/2004 | Palmquist | ................. | 704/7 |
| 2005/0075858 A1* | 4/2005 | Pournasseh et al. | ................. | 704/2 |
| 2006/0107210 A1* | 5/2006 | Lee | ................. | G06F 3/0237 715/261 |
| 2007/0239760 A1* | 10/2007 | Simon | ................. | 707/102 |
| 2009/0125497 A1* | 5/2009 | Jiang et al. | ................. | 707/4 |
| 2010/0110080 A1* | 5/2010 | Goodinson | ................. | 345/467 |
| 2012/0046933 A1* | 2/2012 | Frei et al. | ................. | 704/2 |
| 2012/0124065 A1* | 5/2012 | Butterfield et al. | ................. | 707/755 |
| 2012/0143598 A1* | 6/2012 | Bandara | ................. | 704/10 |
| 2012/0197628 A1* | 8/2012 | Best et al. | ................. | 704/2 |
| 2012/0203553 A1* | 8/2012 | Maruta | ................. | 704/243 |
| 2012/0330641 A1* | 12/2012 | Kalb | ................. | G06F 17/2881 704/2 |
| 2013/0197896 A1* | 8/2013 | Chalabi | ................. | G06F 17/2735 704/2 |
| 2013/0253901 A1* | 9/2013 | Krack | ................. | G06F 17/289 704/2 |
| 2013/0262080 A1* | 10/2013 | Marciano | ................. | G06F 17/2836 704/3 |

* cited by examiner

CLOUD-BASED TRANSLATION METHOD AND SYSTEM FOR MOBILE CLIENT

CROSS-REFERENCES TO RELATED APPLICATIONS

This application is a continuation of PCT Application No. PCT/CN2013/078949, filed on Jul. 6, 2013, which claims priority of Chinese Patent Application No. 201210237444.8, filed on Jul. 10, 2012, the entire contents of all of which are incorporated by reference herein.

FIELD OF THE INVENTION

The present invention generally relates to cloud-based translation technologies and, more particularly, relates to a cloud-based translation method and system for a mobile client.

BACKGROUND

With the rapid development of technology, mobile terminal-based applications are becoming a powerful trend, i.e., reading files by mobile terminals. When reading a file on a mobile terminal, a user may have difficulty in understanding contents or need to learn what exactly the content means, i.e., having difficulty in understanding meaning of words from foreign languages or meaning of the corresponding native language, or having difficulty in understanding meaning of a word from a native language. In this situation, the user may need a physical dictionary to obtain the meaning of the word, or use a translation software installed on the mobile terminal to perform the translation.

When the translation software installed on the mobile terminal is used, translation is done through glossaries of the translation software. Due to the limitation on software capacity and storage space of mobile terminal, the glossaries of the translation software stored on the mobile terminal is very limited, greatly reducing the accuracy of the translation.

In order to overcome the limitation, one approach is to, after selecting the text contents, send the text contents to an online translation server for translation. A relatively appropriate translation result can be obtained based on the online translation server database. The translation result is then displayed on the mobile terminal in a full-screen for user to view. However, under this approach, the online translation server needs to re-translate online the text for each translation process, even though the content is exactly the same as the previous. This can limit translation efficiency significantly, impacting the reading continuity of the mobile terminal user.

The disclosed method and system are directed to solve one or more problems set forth above and other problems.

BRIEF SUMMARY OF THE DISCLOSURE

One aspect of the present disclosure includes a cloud-based translation method for a mobile client. The mobile client receives a translation instruction; the mobile client sends translation request information to a cloud server based on the translation instruction, where the translation request information includes text information and translation type information. The mobile client receives a translation result returned from the cloud server, wherein when the cloud server detects that the mobile terminal of the mobile client logins to an account with a preset communication type, and a cloud glossary of the account contains a word entry corresponding to the text information. The cloud server returns the translation result in the cloud glossary of the account corresponding to the word entry. When the cloud server detects that the mobile terminal does not login to the account with the preset communication type, or when the cloud server detects that the mobile terminal logins to the account but the cloud glossary of the account does not contain the word entry corresponding to the text information, the cloud server translates the text information based on the translation request information to obtain and return the translation result.

Another aspect of the present disclosure includes a cloud-based translation method for a mobile client. A cloud server receives cloud translation request information which includes text information and translation type information sent from the mobile client. The cloud server detects whether a mobile terminal of the mobile client logins to an account with a preset communication type, and the cloud server further detects whether a cloud glossary of the account has a word entry corresponding to the text information if the mobile terminal of the mobile client logins to the account with a preset communication type. The cloud server sends the translation result corresponding to the word entry in the cloud glossary of the account to the mobile client if the word entry is in the cloud glossary of the account. Based on the cloud translation request information, the cloud server obtains the translation result and sends to the mobile client when the mobile terminal of the mobile client does not login to the account with a preset communication type, or when the mobile terminal of the mobile client logins to the account with a preset communication type and the cloud glossary of the account does not contain the word entry corresponding to the text information.

Another aspect of the present disclosure includes a cloud-based translation system for a mobile client. The system comprises a mobile client and a cloud server. The mobile client includes an instruction receiving unit configured to receive a translation instruction which includes text information and translation type information; a mobile client interactive unit configured to send cloud translation request information which includes the text information and the translation type information to a cloud server based on the translation instruction, and to receive a translation result returned from the cloud server. When the cloud server detects that the mobile terminal of the mobile client logins to an account with a preset communication type, and a cloud glossary of the account contains a word entry corresponding to the text information, the cloud server returns the translation result in the cloud glossary of the account corresponding to the word entry. Further, when the cloud server detects that the mobile terminal does not login to the account with the preset communication type, or when the cloud server detects that the mobile terminal logins to the account but the cloud glossary of the account does not contain the word entry corresponding to the text information, the cloud server translates the text information based on the translation request information to obtain and return the translation result.

Another aspect of the present disclosure includes a cloud-based translation system for a mobile terminal including a cloud server. The cloud server includes a cloud server information receiving/sending unit configured to receive cloud translation request information which includes text information and translation type information sent from the mobile client, and to send the translation result obtained from a cloud glossary read unit or the translation result obtained from a translation unit to the mobile client. The cloud server also includes a cloud server account detection unit configured to detect whether a mobile terminal of the mobile client logins to an account with a preset communication type; and a word entry detection unit configured to detect whether a cloud glossary of the account contains a word entry corresponding to the text information when the cloud server detects that a mobile terminal of the mobile client logins to an account with a preset communication type. The cloud server also includes a cloud glossary read unit and the translation unit. The cloud glossary read unit is configured to obtain the translation result corresponding to a word entry in a cloud glossary of the account when a cloud glossary of the account contains the word entry corresponding to the text information; the translation unit is configured to translates the text information based on the cloud translation request information when the cloud server account detection unit of the cloud server detects that a mobile terminal does not login to an account with a preset communication type, or when the word entry detection unit detects that a cloud glossary of the account does not contain a word entry corresponding to the text information.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings.

Figure 6:
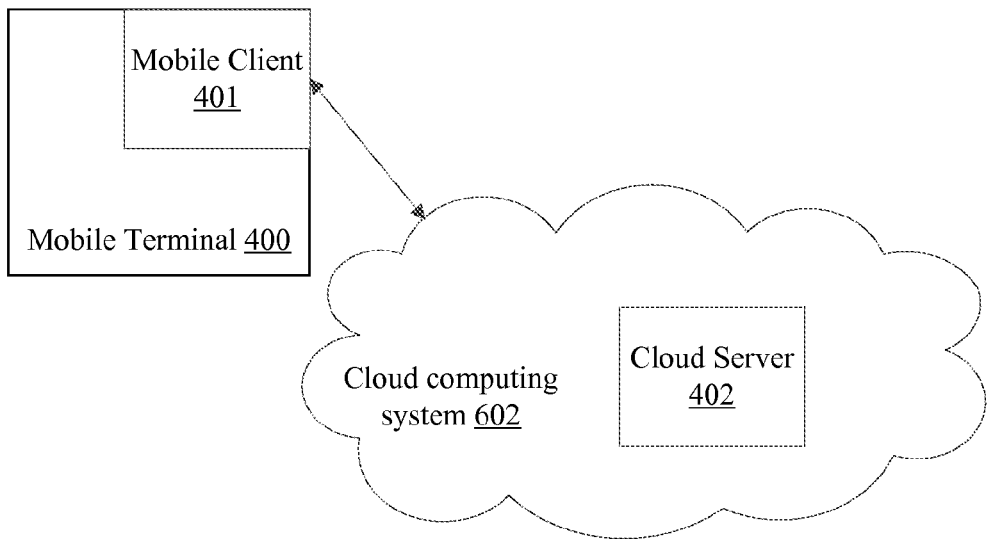
FIG. 6 illustrates an environment incorporating certain aspects of the present invention.

FIG. 6 illustrates an exemplary environment 600 incorporating certain disclosed embodiments. As shown in FIG. 6, environment 600 may include a mobile terminal 400 and a cloud computing system 602. The cloud computing system 602 may include various servers and other components to implement a cloud computing platform. For example, cloud computing system 602 may include cloud servers (e.g., physical or virtual server computers), networks (e.g., the Internet or other types of computer networks or telecommunication networks, either wired or wireless.), network storages, databases, operating systems (OS), programming language execution environments, and web servers, etc.

Cloud computing system 602 may include one or more cloud servers. Cloud server 402 may include any appropriate server computers configured to provide certain cloud-based server functionalities, such as a translation server functionality for responding a user's request for translation. Although only one cloud server is shown, any number of cloud server 402 can be included.

Mobile terminal 400 may include any appropriate type of mobile device, such as a mobile phone, a smart phone, a tablet, a notebook computer, or any type of mobile computing platform. Mobile terminal 400 may include one or more mobile clients 401. The mobile client 401, as used herein, may include any appropriate mobile application software, hardware, or a combination of application software and hardware to achieve certain client functionalities. For example, mobile client 401 may include a mobile browser, etc. According to actual needs in different mobile terminals, a mobile client may be a mobile browser installed in mobile terminal for reading, including various types of existing and future mobile browser installed in mobile terminals. Although only one mobile client 401 is shown in the environment 600, any number of mobile client 401 may be included.

Figure 7:
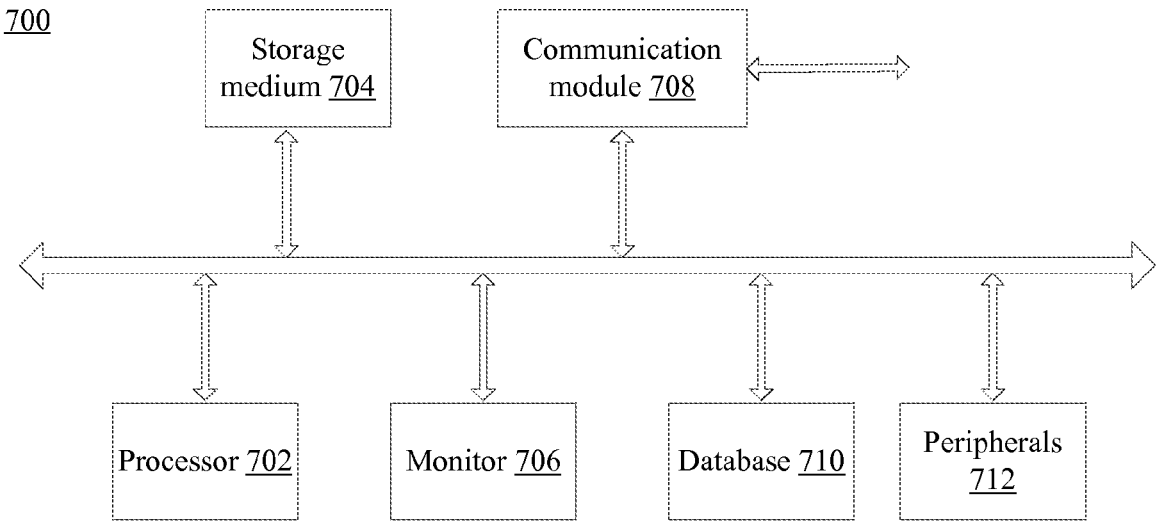
FIG. 7 illustrates a block diagram of an exemplary computing system according to the disclosed embodiments.

Mobile terminal 400, mobile client 401, and/or cloud server 402 may be implemented on any appropriate computing platform. FIG. 7 shows a block diagram of an exemplary computer system 700 capable of implementing mobile terminal 400, mobile client 401, and/or cloud server 402.

As shown in FIG. 7, computer system 700 may include a processor 702, a storage medium 704, a monitor 706, a communication module 708, a database 710, and peripherals 712. Certain devices may be omitted and other devices may be included.

Processor 702 may include any appropriate processor or processors. Further, processor 702 can include multiple cores for multi-thread or parallel processing. Storage medium 704 may include memory modules, such as ROM, RAM, flash memory modules, and erasable and rewritable memory, and mass storages, such as CD-ROM, U-disk, and hard disk, etc. Storage medium 704 may store computer programs for implementing various processes, when executed by processor 702.

Further, peripherals 712 may include I/O devices such as keyboard and mouse, and communication module 708 may include network devices for establishing connections through the communication network. Database 710 may include one or more databases for storing certain data and for performing certain operations on the stored data, such as database searching.

Figure 1:
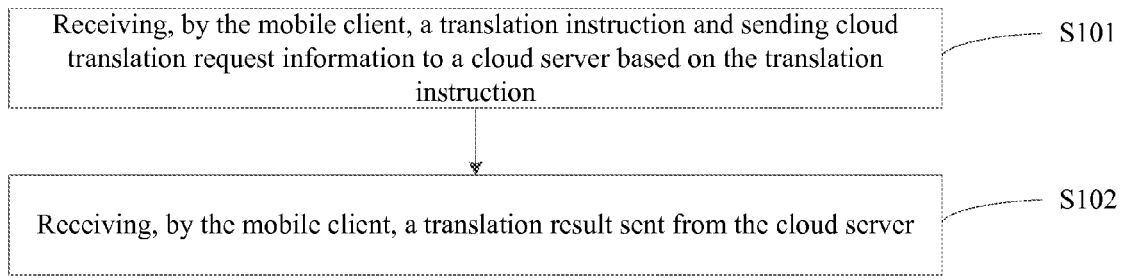
FIG. 1 illustrates a flow diagram of an exemplary cloud-based translation method for a mobile client consistent with the disclosed embodiments.

In operation, mobile client 401 and cloud server 402 may interact with each other to provide a cloud-based translation service to the user(s) of the mobile client 401. FIG. 1 illustrates a flow diagram of a cloud-based translation method for a mobile client consistent with the disclosed embodiments.

As shown in FIG. 1, from the mobile client's view point, the cloud-based translation method includes the following steps:

S101: a mobile client receives a translation instruction and sends cloud translation request information to a cloud server. The cloud translation request information includes at least text information and translation type information.

S102: the mobile client receives a translation result returned from the cloud server. The translation result may be determined by the cloud server based on the translation request information and other information about the mobile client. When the cloud server detects that the mobile terminal of the mobile client logins to an account with a preset communication type, and the cloud glossary (i.e., a glossary or dictionary on the cloud server or from the cloud computing system) of the account contains a word entry corresponding to the text information, the cloud server returns the translation result in the cloud glossary of the account corresponding to the word entry.

When the cloud server detects that the mobile terminal of the mobile client does not login to an account with a preset communication type, or when the cloud server detects that the mobile terminal of the mobile client logins to the account with the preset communication type but the cloud glossary of the account does not contain the word entry corresponding to the text information, the cloud server translates the text information based on the translation request information and returns the translation result.

According to some embodiments, the translation instruction received by the mobile client may be a translation instruction sent by a mobile user in various possible ways. In one implementation, during the user's reading process, when text information being selected by the user for a time period exceeds a default time period, a corresponding operation prompt toolbar is displayed. The user, through the toolbar, selects required translation information and translation type information. As used herein, the translation type information may include translation from any language type to any other language type (such as translation from Chinese to English, and translation from English to Chinese), specific interpretation for content of the current text information (such as specific English meaning of an English letter, specific Chinese meaning of a Chinese character or a Chinese word, and specific interpretation of a number), and so on. The mobile client receives the translation instruction through the operation prompt toolbar.

In another implementation, when the cloud server detects that a mobile terminal of the mobile client logins to an account with a preset communication type and the cloud glossary of the account does not contain a word entry corresponding to the above text information, the cloud server sends out a cloud-glossary-addition prompt message. The mobile client also receives and displays the cloud-glossary-addition prompt message.

After the cloud-glossary-addition prompt message is displayed, the user decides whether the word entry corresponding to the above text information needs to be added to the cloud glossary. If the user selects the addition option, a cloud-glossary-addition instruction is sent. After receiving the cloud-glossary-addition instruction from the user, the mobile client sends cloud-glossary-addition request information to the cloud server. The cloud server adds the word entry corresponding to the above text information to the cloud glossary, thus significantly improving translation efficiency for subsequent translation processes.

After the mobile client receives the translation result from the cloud server, the user may edit the translation result, making the revised translation result more consistent with the overall linguistic environment of the current text or more appropriate for the current buzzwords environment, etc. In this case, the cloud-glossary-addition request information may include the edited translation result, thus the revised translation result is added to the cloud glossary corresponding to the user account.

In addition, after the mobile client receives the returned translation result, based on a default display mode (e.g., a full-screen mode, a bubble message mode, etc.), the returned translation result is displayed to the user. Different display mode may be selected depending on different application needs. The bubble message mode may be automatically closed after a default time period or when the user leaves the currently selected text in the mobile client.

Figure 2:
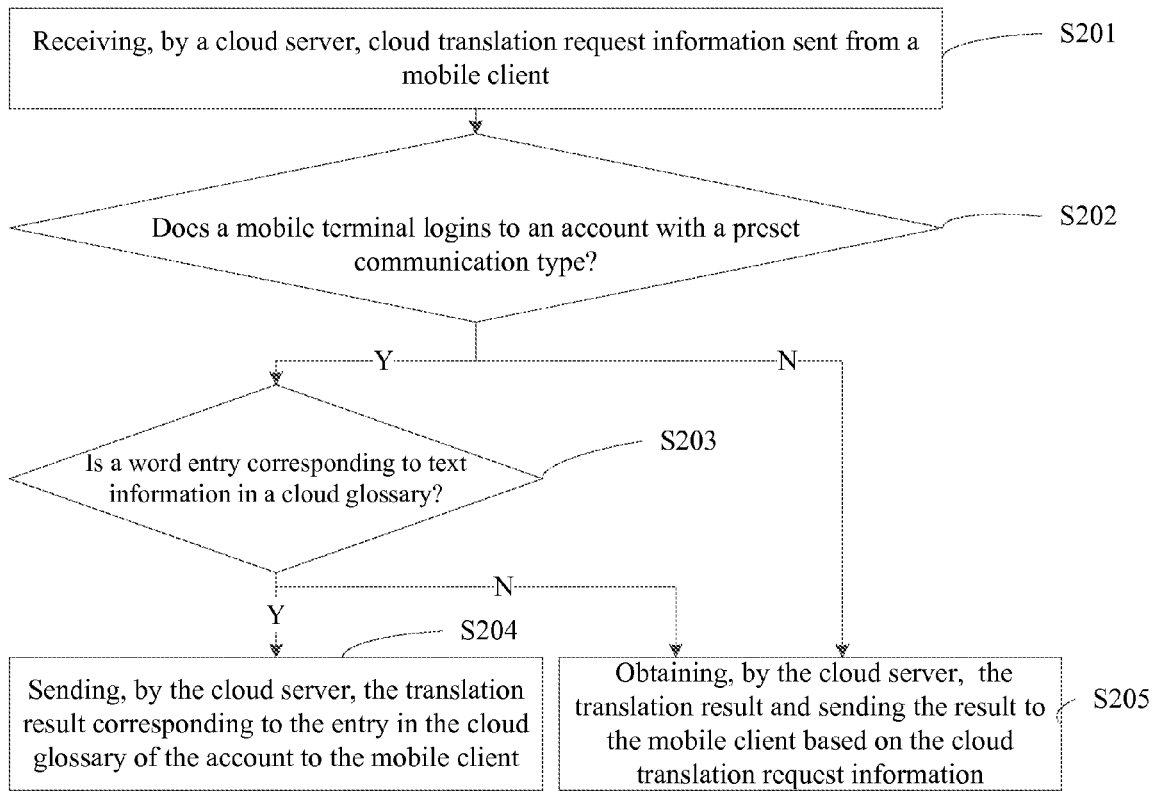
FIG. 2 illustrates a flow diagram of another exemplary cloud-based translation method for a mobile client consistent with the disclosed embodiments.

FIG. 2 illustrates a flow diagram of a cloud-based translation method for a mobile client consistent with the disclosed embodiments. As shown in FIG. 2, from the cloud server's view point, the cloud-based translation process includes the following steps:

S201: the cloud server receives cloud translation request information sent from the mobile client. The cloud translation request information includes text information and translation type information.

S202: the cloud server detects whether mobile terminal of the mobile client logins to an account with a preset communication type. If the mobile terminal of the mobile client logins to the account with the preset communication type, the translation process goes to S203; otherwise, the translation process goes to S205.

S203: the cloud server detects whether the cloud glossary of the account has a word entry (e.g., a word, a phrase, or a term) corresponding to the above text information. If the word entry is in the cloud glossary of the account, the translation process goes to S204; otherwise, the translation process goes to S205.

S204: the translation result corresponding to the word entry in the cloud glossary of the account is sent to the mobile client.

S205: based on the cloud translation request information, the cloud server translates the text information and the translation result is sent to the mobile client.

In S203, when the cloud server detects that the mobile terminal of the mobile client logins to an account with a preset communication type and the cloud glossary of the account does not contain a word entry corresponding to the above text information, the cloud server may also send the cloud-glossary-addition prompt message to the mobile client, prompting the user to add the text information to the cloud glossary of the account, thus improving translation efficiency of subsequent translation process. In the subsequent process, when the cloud server receives the same translation request information sent by the mobile client that logins to the account with a preset communication type of the mobile terminal again, the corresponding translation result is directly obtained from the cloud glossary and returned to the mobile client without performing the translation process.

After the cloud-glossary-addition prompt message is sent to the mobile client, the mobile client sends cloud-glossary-addition request information to the cloud server when the user of the mobile client selects the addition option. When the cloud server receives the cloud-glossary-addition request information sent from the mobile client, based on the cloud-glossary-addition request information, a word entry corresponding to the above text information and the corresponding translation result are stored in the cloud glossary corresponding to the above account. As used herein, the translation result that is added to the cloud glossary may be either the translation result obtained based on the cloud translation request information or the revised translation result sent by the mobile client.

Figure 3:
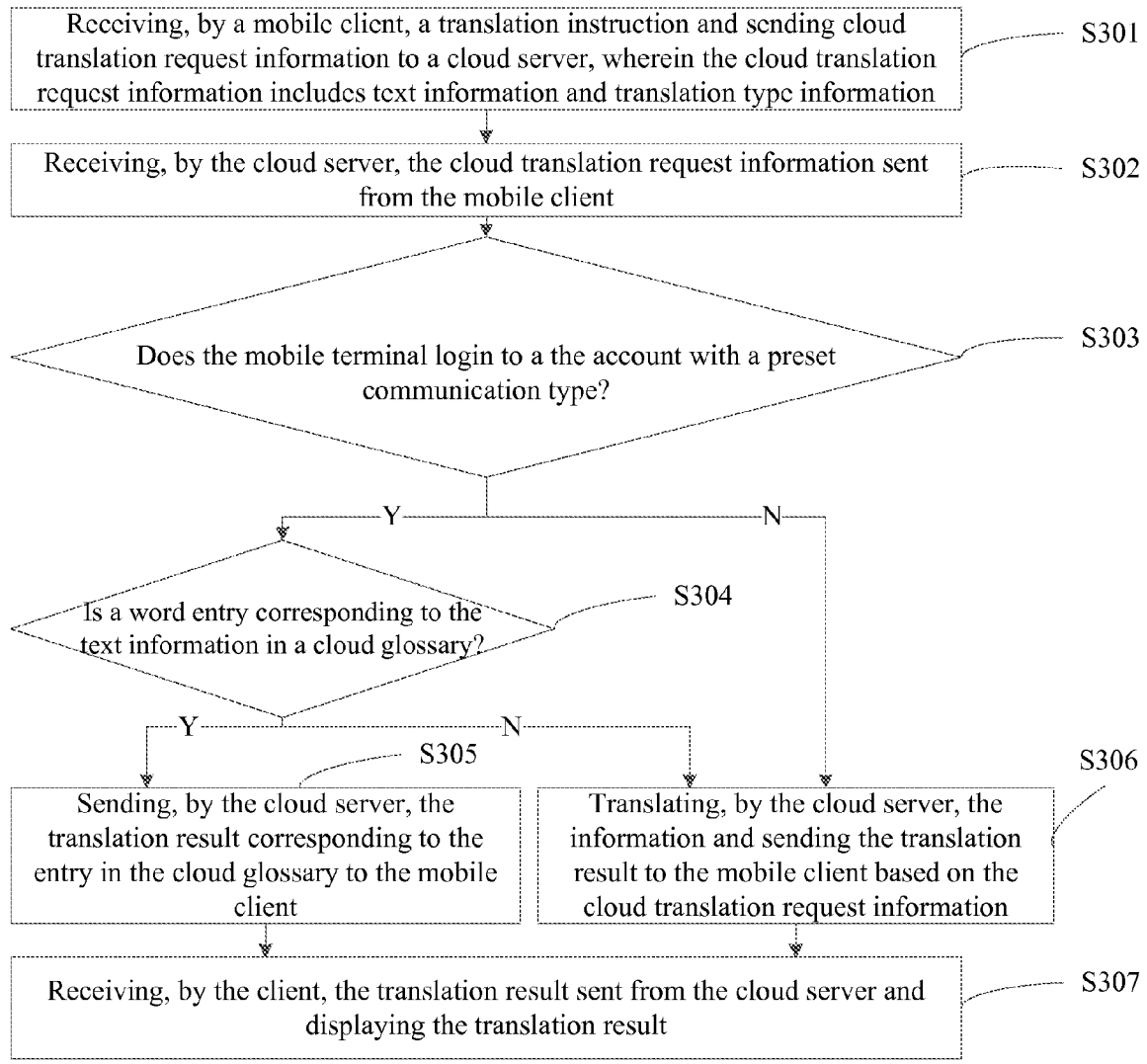
FIG. 3 illustrates a flow diagram of another exemplary cloud-based translation method for a mobile client consistent with the disclosed embodiments.

FIG. 3 illustrates a flow diagram of another exemplary cloud-based translation method for a mobile client consistent with the disclosed embodiments.

As shown in FIG. 3, from view point of an interactive process between a mobile client and a cloud server, the cloud-based translation process includes the following steps:

S301: the mobile client receives a translation instruction and sends cloud translation request information which includes text information and translation type information to the cloud server.

S302: the cloud server receives the cloud translation request information sent from the mobile client.

S303: the cloud server detects whether the mobile terminal of the mobile client logins to an account with a preset communication type. If the mobile terminal of the mobile client logins to the account with a preset communication type, the translation process goes to S304; otherwise, the translation process goes to S306.

S304: the cloud server detects whether the cloud glossary of the account has a word entry corresponding to the text information. If the word entry is in the cloud glossary of the account, the translation process goes to S305; otherwise, the translation process goes to S306.

S305: the cloud server sends the translation result corresponding to the word entry in the cloud glossary of the account to the mobile client.

S306: based on the cloud translation request information, the cloud server translates the text information and the translation result is sent to the mobile client.

S307: the mobile client receives the translation result returned from the cloud server and displays the translation result.

In S303, when the cloud server detects whether the mobile terminal of the mobile client logins to the account with a preset communication type, one of the detection methods is based on the cloud translation request information sent from the mobile client to the cloud server. The cloud translation request information includes information on whether the mobile terminal logins to the account with a preset communication type and the account with a preset communication type when the mobile terminal logins to the account with a preset communication type, etc.

In the present disclosure, based on whether the mobile terminal of the mobile client logins to the account with a preset communication type, the information in the cloud translation request sent from the client to the cloud server is different. Several examples in different situations are described.

In one example, the mobile terminal of the mobile client does not login to the account with a preset communication type, the specific interaction is described as follows.

The mobile client receives a translation instruction, and detects whether the mobile terminal of the mobile client logins to an account with a preset communication type. If the mobile terminal of the mobile client does not login to the account with a preset communication type, the mobile client sends cloud translation request information to the cloud server. The cloud translation request information includes text information and translation type information. The cloud translation request information may also include information that the mobile terminal of the mobile client does not login to the account with a preset communication type or does not include related information on whether the mobile terminal of the mobile client logins to the account with a preset communication type.

The cloud server receives the cloud translation request information sent from the mobile client. Based on the cloud translation request information, the cloud server detects whether the mobile terminal of the mobile client logins to the account with a preset communication type. Because the cloud translation request information includes information that the mobile terminal of the mobile client does not login to the account with a preset communication type or does not include related information on whether the mobile terminal of the mobile client logins to the account with a preset communication type, the cloud server judges that the mobile terminal of the mobile client does not login to the account with a preset communication type.

Then, the cloud server translates the information to obtain a translation result based on the text information and the translation type information in the cloud translation request information. The translation result is sent to the mobile client.

The mobile client receives the translation result returned from the cloud server and displays the translation result.

In another example, the mobile terminal of the mobile client logins to the account with a preset communication type and a cloud glossary of the account has a word entry corresponding to the above text information, the specific interaction is described as follows.

The mobile client receives a translation instruction, and detects whether the mobile terminal of the mobile client logins to an account with a preset communication type. If the mobile terminal of the mobile client logins to the account with a preset communication type, the mobile client sends the cloud translation request information to the cloud server. The cloud translation request information includes text information and translation type information. The cloud translation request information also includes the account with a preset communication type.

The cloud server receives the cloud translation request information sent from the mobile client. Based on the cloud translation request information, the cloud server detects whether the mobile terminal logins to the account with a preset communication type. Because the cloud translation request information includes the account with a preset communication type, the cloud server can judge that the mobile terminal logins to the account with a preset communication type.

Then, the cloud server detects whether the cloud glossary of the account has a word entry corresponding to the text information. If the word entry corresponding to the above text information is in the cloud glossary of the account, the cloud server does not need to translate the text information. The cloud server sends the translation result corresponding to the word entry in the cloud glossary of the account to the mobile client.

The mobile client receives the translation result returned from the cloud server and displays the translation result.

In another example, the mobile terminal of the mobile client logins to the account with a preset communication type but a cloud glossary of the account does not have a word entry corresponding to the above text information. The specific interaction is described as follows.

The mobile client receives a translation instruction, and detects whether the mobile terminal of the mobile client logins to an account with a preset communication type. If the mobile terminal of the mobile client logins to the account with a preset communication type, the mobile client sends the cloud translation request information to the cloud server. The cloud translation request information includes text information and translation type information. The cloud translation request information also includes the account with a preset communication type.

The cloud server receives the cloud translation request information sent from the mobile client. Based on the cloud translation request information, the cloud server detects whether the mobile terminal logins to the account with a preset communication type. Because the cloud translation request information includes the account with a preset communication type, the cloud server judges that the mobile terminal logins to the account with a preset communication type.

Then, the cloud server detects whether a cloud glossary of the account has a word entry corresponding to the text information. If the cloud glossary of the account does not contain the word entry corresponding to the above text information, the cloud server translates the text information based on the text information and the translation type information to obtain the translation result. The cloud server then sends the translation result to the mobile client.

The mobile client receives the translation result returned from the cloud server and displays the translation result.

Because the cloud server detects that the cloud glossary of the account does not contain the word entry corresponding to the text information, when the cloud server returns the translation result to the mobile client, or after the cloud server detects that the cloud glossary of the account does not contain the word entry corresponding to the text information, or after the cloud server returns the translation result to the mobile client, the cloud server sends a cloud-glossary-addition prompt message to the mobile client to prompt the user to add the text information to the cloud glossary of the account, thus improving translation efficiency of subsequent translation process.

The mobile client receives the cloud-glossary-addition prompt message and displays the cloud-glossary-addition prompt message.

After the cloud-glossary-addition prompt message is displayed, the user selects whether the word entry corresponding to the text information is added to the cloud glossary. If the user selects addition option, a cloud-glossary-addition instruction is sent. After the mobile client receives the cloud-glossary-addition instruction, the mobile client sends the cloud-glossary-addition request information to the cloud server.

The cloud server receives the cloud-glossary-addition request information sent from the mobile client, based on the cloud-glossary-addition request information, a word entry corresponding to the text information and the corresponding translation result are stored in the cloud glossary corresponding to the account.

After the cloud server successfully stores the word entry corresponding to the above text information and the corresponding translation result in the cloud glossary corresponding to the above account, the cloud server also returns the prompt message that the addition operation is successful to the mobile client.

According to specific situations, the translation result added to the cloud glossary may be different. In one situation, after the mobile client receives the translation result from the cloud server, the user may edit the translation result, making the revised translation result more consistent with the overall linguistic environment of the current text or more appropriate for the current buzzwords environment. In this situation, the cloud-glossary-addition request information includes the translation result that is obtained after the user edits the returned translation result, thus the revised translation result is added to the cloud glossary corresponding to the user account.

In another situation, after the mobile client receives the translation result from the cloud server, the user does not edit the translation result. Thus, the cloud-glossary-addition request information does not include information about the translation result. The cloud server directly adds the translation result to the cloud glossary corresponding to the user account.

Other technical characteristics of embodiments, such as specific information transmission type, specific content of the translation type information and display mode of the translation result, are the same as the above descriptions. The detailed descriptions are not repeated here.

Figure 4:
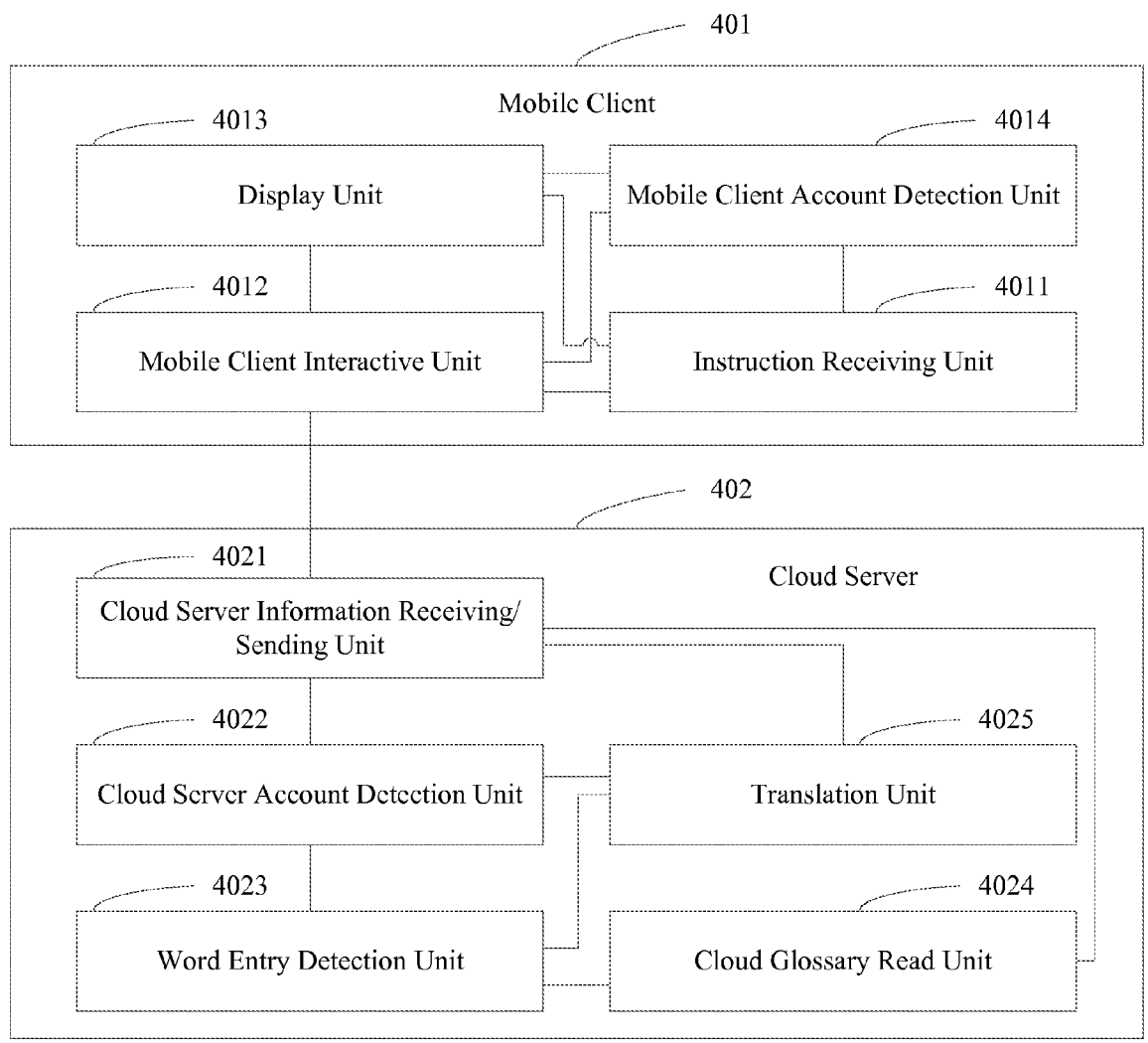
FIG. 4 illustrates a schematic of an exemplary cloud-based translation system for a mobile client consistent with the disclosed embodiments.
Figure 5:
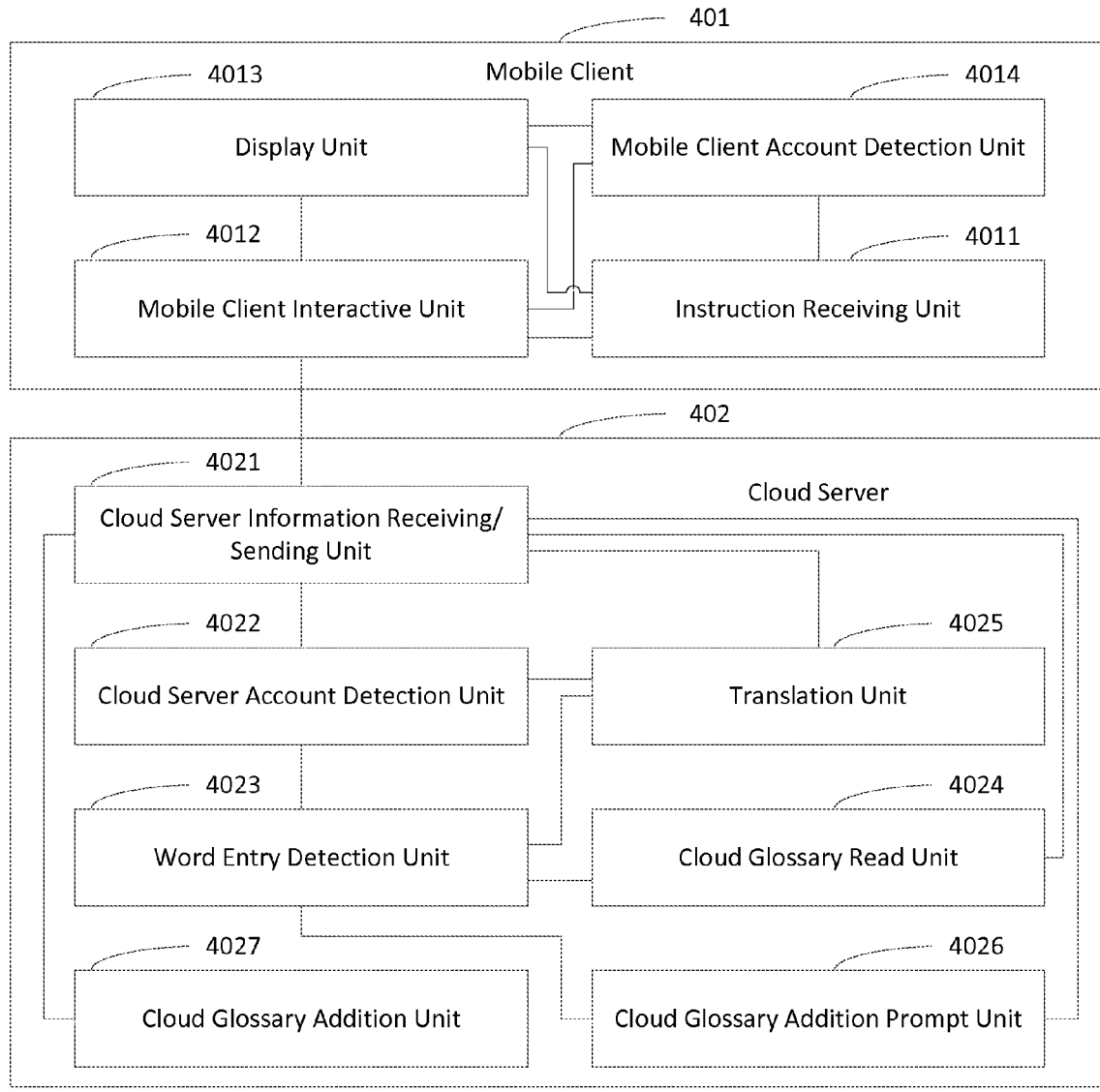
FIG. 5 illustrates a schematic of another exemplary cloud-based translation system for a mobile client consistent with the disclosed embodiments.

Base on the cloud-based translation method for the mobile client, the present disclosure also provides a cloud-based translation system for the mobile client. The cloud-based translation system for the mobile client may include only one or more mobile clients, only one or more cloud servers, or both one or more mobile clients and one or more cloud servers. For convenience of explanation, as used herein, the system includes both a mobile client 401 and a cloud server 402. FIG. 4 and FIG. 5 illustrate schematics of the cloud-based translation system for the mobile client consistent with the disclosed embodiments. FIG. 4 and FIG. 5 are described separately below.

FIG. 4 illustrates a schematic of a cloud-based translation system for the mobile client consistent with the disclosed embodiments. As shown in FIG. 4, the mobile client 401 includes an instruction receiving unit 4011 and a mobile client interactive unit 4012.

The instruction receiving unit 4011 is configured to receive a translation instruction. The translation instruction includes text information and translation type information.

The mobile client interactive unit 4012 is configured to send cloud translation request information to the cloud server 402 based on the translation instruction and receive a translation result returned from the cloud server 402. The cloud translation request information includes the text information and the translation type information.

The returned translation result can be the result translated based on the cloud translation request information when the cloud server 402 detects that a mobile terminal of the mobile client does not login to an account with a preset communication type, or when the cloud server detects that the mobile terminal of the mobile client logins to an account with a preset communication type but a cloud glossary of the account does not have an word entry corresponding to the above text information. The returned translation result can also be the translation result corresponding to the word entry in the cloud glossary of the account when the cloud server detects that a mobile terminal of the mobile client logins to an account with a preset communication type and a cloud glossary of the account has a word entry corresponding to the above text information.

Further, as shown in FIG. 4, the cloud server 402 includes a cloud server information receiving/sending unit 4021, a cloud server account detection unit 4022, a word entry detection unit 4023, a cloud glossary read unit 4024, and translation unit 4025.

The cloud server information receiving/sending unit 4021 is configured to receive cloud translation request information which includes text information and translation type information sent from the mobile client, and sends translation result obtained from a cloud glossary read unit 4024 or translation result obtained from translation unit 4025 to the mobile client.

The cloud server account detection unit 4022 is configured to detect whether a mobile terminal of the mobile client logins to an account with a preset communication type. The word entry detection unit 4023 is configured to detect whether a cloud glossary of the account has a word entry corresponding to the above text information when the cloud server detects that a mobile terminal of the mobile client logins to the account with a preset communication type;

Further, the cloud glossary read unit 4024 is configured to obtain the translation result corresponding to the word entry in a cloud glossary of the account when a cloud glossary of the account has an entry corresponding to the above text information.

The translation unit 4025 is configured to obtain the translation result translated based on the cloud translation request information when the cloud server account detection unit 4022 of the cloud server detects that a mobile terminal does not login to an account with a preset communication type, or when the word entry detection unit 4023 detects that a cloud glossary of the account does not have a word entry corresponding to the above text information.

Based on the cloud-based translation system for the mobile client shown in FIG. 4, the translation process is described as follows:

The instruction receiving unit 4011 of the mobile client 401 receives a translation instruction, and the mobile client interactive unit 4012 sends cloud translation request information to the cloud server 402 based on the translation instruction. The cloud translation request information includes the text information and the translation type information.

The cloud server information receiving/sending unit 4021 of the cloud server 402 receives the cloud translation request information sent from the mobile client, and the cloud server account detection unit 4022 detects whether the mobile terminal of the mobile client 401 logins to an account with a preset communication type.

If the cloud server account detection unit 4022 detects that the mobile terminal of the mobile client 401 logins to an account with a preset communication type, and the word entry detection unit 4023 then detects whether a cloud glossary of the account has a word entry corresponding to the text information. When the word entry corresponding to the above text information is in the cloud glossary of the account, the cloud glossary read unit 4024 obtains the translation result corresponding to the word entry in a cloud glossary of the account, and the translation result through the cloud server information receiving/sending unit 4021 is sent to the mobile client. On the other hand, when the word entry corresponding to the above text information is not in the cloud glossary of the account, the translation unit 4025 translates the text information based on the cloud translation request information and sends the obtained translation result to the mobile client through the cloud server information receiving/sending unit 4021.

If the cloud server account detection unit 4022 detects that a mobile terminal of the mobile client 401 does not login to an account with a preset communication type, the translation unit 4025 translates the text information based on the above cloud translation request information and sends the obtained translation result to the mobile client through the cloud server information receiving/sending unit 4021.

The mobile client interactive unit 4012 of the mobile client 401 receives the translation result returned from the cloud server 402.

In certain embodiments, the mobile client 401 also includes a display unit 4013. The display unit 4013 is configured to display the translation result received by the mobile client interactive unit 4012 from the cloud server 402. The display mode may be a full-screen mode, a bubble message mode, or any other display mode.

In one implementation, the instruction receiving unit 4011 in the mobile client 401 is also configured to receive the translation instruction through an operation prompt toolbar when text information being selected by the user for a time period exceeds a default time period is detected and the corresponding operation prompt toolbar is displayed.

In certain embodiments, the mobile client 401 may also include a mobile client account detection unit 4014 which is configured to detect whether a mobile terminal of the mobile client logins to an account with a preset communication type and the account with a preset communication type when the mobile terminal logins to the account with a preset communication type. As used herein, the cloud translation request information may also include information on whether the mobile terminal logins to the account with a preset communication type and the account with a preset communication type when the mobile terminal logins to the account with a preset communication type. Thus, it is convenient to perform detection by the cloud server account detection unit 4022 and the word entry detection unit 4023.

FIG. 5 illustrates a schematic of a cloud-based translation system for a mobile client consistent with the disclosed embodiments. The difference between the system in FIG. 5 and the system in FIG. 4 is that the translation result is added to a cloud glossary corresponding to a user account.

As shown in FIG. 5, the cloud server 402 also includes a cloud-glossary-addition prompt unit 4026. The cloud-glossary-addition prompt unit 4026 is configured to send a cloud-glossary-addition prompt message to the mobile client by the cloud server information receiving/sending unit 4021 when the word entry detection unit 4023 detects that the word entry corresponding to the above text information is not added to the cloud glossary of the account.

Accordingly, in the mobile client 401, the mobile client interactive unit 4012 is also configured to receive the cloud-glossary-addition prompt message when the cloud server 402 detects that the mobile terminal of the mobile client logins to an account with a preset communication type and the cloud glossary of the account does not contain a word entry corresponding to the text information. The display unit 4013 of the mobile client 401 is also configured to display the cloud-glossary-addition prompt message.

Accordingly, in certain embodiments, the mobile client 401 includes the instruction receiving unit 4011 and the mobile client interactive unit 4012. The instruction receiving unit 4011 is also configured to receive the cloud-glossary-addition instruction based on the cloud-glossary-addition prompt message. The mobile client interactive unit 4012 is configured to send cloud-glossary-addition request information to the cloud server 402 based on the cloud-glossary-addition instruction.

The cloud server 402 includes the cloud server information receiving/sending unit 4021 and a cloud-glossary-addition unit 4027. The cloud server information receiving/sending unit 4021 is also configured to receive the cloud-glossary-addition request information sent from the mobile client.

The cloud-glossary-addition unit 4027 is configured to store the word entry corresponding to the text information and the corresponding translation result in the cloud glossary corresponding to the account based on the cloud translation request information. As used herein, the added corresponding translation result is the translation result translated by the cloud server based on the cloud translation request information or the translation result received from the mobile client. When the added translation result is the translation result translated by the cloud server based on the cloud translation request information, the cloud addition request information may include the revised translation result after the user edits the returned translation result.

Based on the cloud-based translation system for a mobile client shown in FIG. 5, the translation process may be described as follows.

When the cloud server account detection unit 4022 detects that a mobile terminal of the mobile client 401 logins to an account with a preset communication type, and the word entry detection unit 4023 detects that a cloud glossary of the account does not have a word entry corresponding to the text information the translation unit 4025 translates the text information based on the cloud translation request information and sends the translation result to the mobile client 401 through the cloud server information receiving/sending unit 4021.

When the obtained translation result is sent back to the mobile client 401 through the cloud server information receiving/sending unit 4021, or after the word entry detection unit 4023 detects that the cloud glossary of the account does not contain a word entry corresponding to the text information, or after the cloud server information receiving/sending unit 4021 returns the translation result to the client, the cloud-glossary-addition prompt unit 4026 sends the cloud-glossary-addition prompt message to the mobile client by the cloud server information receiving/sending unit 4021 to prompt the user to add the text information to the cloud glossary of the account, thus improving translation efficiency of subsequent translation process. The cloud-glossary-addition prompt message and the translation result may be sent together or respectively.

After the mobile client interactive unit 4012 of the mobile client 401 receives the cloud-glossary-addition prompt message sent from the cloud server 402, the cloud-glossary-addition prompt message is displayed by the display unit 4013 in the mobile client 401.

After the cloud-glossary-addition prompt message is displayed, the user selects whether the word entry corresponding to the above text information is added to the cloud glossary. If the user selects addition option, a cloud-glossary-addition instruction is sent. After the cloud server information receiving/sending unit 4021 of the mobile client 401 receives the cloud-glossary-addition instruction, the mobile client interactive unit 4012 sends the cloud-glossary-addition request information to the cloud server 402.

The cloud server information receiving/sending unit 4021 of cloud server 402 receives the cloud-glossary-addition request information sent from the mobile client 401, based on the cloud-glossary-addition request information, the cloud-glossary-addition unit 4027 stores the word entry corresponding to the text information and the corresponding translation result in the cloud glossary corresponding to the account.

According to different specific situations, the translation result added to the cloud glossary may vary.

After the mobile client 401 receives the translation result returned from the cloud server 402, the user may edit the translation result, making the revised translation result more consistent with the overall linguistic environment of the current text or more appropriate for the current buzzwords environment, etc. In this situation, the cloud-glossary-addition request information may include the revised translation result after the user completely edits the translation result, thus the revised translation result is added to the cloud glossary corresponding to the user account.

In addition, after the mobile client 401 receives the translation result returned from the cloud server 402, the user can choose to not edit the translation result. Thus, the cloud-glossary-addition request information does not include information about the translation result; and the cloud server directly adds the obtained translation result to the cloud glossary corresponding to the user account.

As used herein, other technical characteristics of the cloud-based translation system for a mobile client are the same as those of the above cloud-based translation system for a mobile client. The detailed descriptions are not repeated here.

The specific implementation of the cloud-based translation system for a mobile client, such as specific information transmission type, specific content of the translation type information and display mode of the translation result are the same as those of the above cloud-based translation method for a mobile client. The detailed descriptions are not repeated here.

The various types of mobile clients that can be supported by the system may include mobile phones, mobile browsers, etc. In the above embodiments, the mobile terminal of the mobile client is a mobile phone. According to actual needs in different mobile terminals, mobile clients may be mobile browsers installed in mobile terminals for reading, including various types of existing and future mobile browsers installed in mobile terminals.

In addition, according to actual needs, the preset communication type may be different communication types, such as instant messaging type, including QQ, MSN, mobile phone number, FETION as well as a variety of possible future instant messaging types, or other related communication accounts that may implement user login function, for example, email account, Facebook account, etc.

The above descriptions merely disclose certain embodiments of the present invention, and are not intended to limit the scope of the present invention. Without departing from the spirit and principles of the present invention, any modifications, equivalent replacements, and improvements, etc., should be included in the protection scope of the present invention. Therefore, the scope of the present disclosure should be defined by the attached claims.

What is claimed is:

1. A cloud-based translation method for a mobile client on a mobile terminal, comprising:
   receiving, by the mobile client, a translation instruction;
   sending, by the mobile client, translation request information to a cloud server based on the translation instruction, where the translation request information includes text information and translation type information; and
   receiving, by the mobile client, a translation result returned from the cloud server, wherein:
      when the cloud server detects that the mobile terminal of the mobile client logins to an account with a preset communication type, and a cloud glossary of the account contains a word entry corresponding to the text information, the cloud server returns the translation result in the cloud glossary of the account corresponding to the word entry; and
      when the cloud server detects that the mobile terminal does not login to the account with the preset communication type, or when the cloud server detects that the mobile terminal logins to the account but the cloud glossary of the account does not contain the word entry corresponding to the text information, the cloud server translates the text information based on the translation request information to obtain and return the translation result.

2. The method according to claim 1, further including:
   receiving, by the mobile client, a cloud-glossary-addition prompt message sent from the cloud server when the cloud server detects that the mobile terminal logins to the account but the cloud glossary of the account does not contain the word entry corresponding to the text information; and
   displaying, by the mobile client, the glossary addition prompt message.

3. The method according to claim 1, further including: receiving, by the mobile client, a cloud-glossary-addition instruction based on the cloud-glossary-addition prompt message; and sending, by the mobile client, cloud-glossary-addition request information to the cloud server, where the cloud-glossary-addition request information includes a revised translation result edited by a user based on the returned translation result.

4. The method according to claim 1, further including:
   displaying, by the mobile client, the returned translation result by a full-screen mode, a bubble message mode, or any other display mode after the mobile client receives the translation result returned from the cloud server.

5. The method according to claim 1, further including:
displaying a corresponding operation prompt toolbar when the mobile client detects that text information being selected by the user for a time period exceeds a default time period before the mobile client receives the translation instruction; and
receiving the translation instruction through the prompt toolbar.

6. The method according to claim 1, further including:
detecting, by the mobile client, whether a mobile terminal of the mobile client logins to an account with a preset communication type.

7. The method according to claim 1, wherein the cloud translation request information further includes:
information on whether the mobile terminal logins to the account with a preset communication type and the account with a preset communication type when the mobile terminal logins to the account with the preset communication type.

8. A cloud-based translation method for a mobile client, comprising:
receiving, by a cloud server, cloud translation request information which includes text information and translation type information sent from the mobile client;
detecting, by the cloud server, whether a mobile terminal of the mobile client logins to an account with a preset communication type;
detecting, by the cloud server, whether a cloud glossary of the account has a word entry corresponding to the text information if the mobile terminal of the mobile client logins to the account with the preset communication type; sending a translation result corresponding to the word entry in the cloud glossary of the account to the mobile client if the word entry is in the cloud glossary of the account; and
obtaining the translation result and sending to the mobile client, based on the cloud translation request information, when the mobile terminal of the mobile client does not login to the account with the preset communication type, or when the mobile terminal of the mobile client logins to the account with the preset communication type and the cloud glossary of the account does not contain the word entry corresponding to the text information.

9. The method according to claim 8, further including:
sending, by the cloud server, a cloud-glossary-addition prompt message to the mobile client when the cloud server detects that the mobile terminal of the mobile client logins to an account with the preset communication type and the cloud glossary of the account does not contain the word entry corresponding to the text information.

10. The method according to claim 9, further including:
receiving, by the cloud server, the cloud-glossary-addition request information sent from the mobile client, and storing the word entry corresponding to the text information and the corresponding translation result in the cloud glossary corresponding to the account based on the cloud-glossary-addition request information, wherein the translation result is the result translated based on the cloud translation request information or the translation result received from the mobile client.

11. The method according to claim 8, wherein the cloud translation request information further includes:
information on whether the mobile terminal logins to the account with the preset communication type and the account with the preset communication type when the mobile terminal logins to the account with the preset communication type.

12. A cloud-based translation system for a mobile client comprising a mobile client, the mobile client comprising:
one or more processors;
memory; and
one or more computer program units stored in the memory and to be executed by the one or more processors, the one or more program units including:
an instruction receiving unit configured to receive a translation instruction which includes text information and translation type information; and
a mobile client interactive unit configured to send cloud translation request information which includes the text information and the translation type information to a cloud server based on the translation instruction and receive a translation result returned from the cloud server,
wherein:
when the cloud server detects that the mobile terminal of the mobile client logins to an account with a preset communication type, and a cloud glossary of the account contains a word entry corresponding to the text information, the cloud server returns the translation result in the cloud glossary of the account corresponding to the word entry; and
when the cloud server detects that the mobile terminal does not login to the account with the preset communication type, or when the cloud server detects that the mobile terminal logins to the account but the cloud glossary of the account does not contain the word entry corresponding to the text information, the cloud server translates the text information based on the translation request information to obtain and return the translation result.

13. The system according to claim 12, further including:
a mobile client interactive unit configured to receive a cloud-glossary-addition prompt message when the cloud server detects that the mobile terminal of the mobile client logins to an account with a preset communication type and the cloud glossary of the account does not contain a word entry corresponding to the text information; and
a display unit configured to display the cloud-glossary-addition prompt message.

14. The system according to claim 13, wherein:
the instruction receiving unit is configured to receive a cloud-glossary-addition instruction based on the cloud-glossary-addition prompt message; and
the mobile client interactive unit is configured to send cloud-glossary-addition request information to the cloud server based on the cloud-glossary-addition instruction, where the cloud-glossary-addition information includes the revised translation result that is obtained after a user edits the returned translation result.

15. The system according to claim 12, wherein:
the display unit is configured to display the translation result returned from the mobile client interactive unit by a full-screen mode, a bubble message mode, or any other display mode.

16. The system according to claim 12, wherein:
the instruction receiving unit configured to receive the translation instruction through an operation prompt toolbar when text information being selected by the user for a time period exceeds a default time period is detected and a corresponding operation prompt toolbar is displayed.

17. The system according to claim 12, further including:
a mobile client account detection unit configured to detect whether a mobile terminal of the mobile client logins to an account with the preset communication type and the account with the preset communication type when the mobile terminal logins to the account with the preset communication type.

18. The system according to claim 12, wherein the cloud translation request information further includes:
information on whether the mobile terminal logins to the account with the preset communication type and the account with the preset communication type when the mobile terminal logins to the account with the preset communication type.

19. A cloud-based translation system for a mobile client comprising a cloud server, the cloud server comprising:
one or more processors;
memory; and
one or more computer program units stored in the memory and to be executed by the one or more processors, the one or more program units including:
a cloud server information receiving/sending unit configured to receive cloud translation request information which includes text information and translation type information sent from the mobile client and send the translation result obtained from a cloud glossary read unit or the translation result obtained from a translation unit to the mobile client;
a cloud server account detection unit configured to detect whether a mobile terminal of the mobile client logins to an account with a preset communication type;
a word entry detection unit configured to detect whether a cloud glossary of the account contains a word entry corresponding to the text information when the cloud server detects that a mobile terminal of the mobile client logins to an account with the preset communication type;
a cloud glossary read unit configured to obtain the translation result corresponding to a word entry in a cloud glossary of the account when a cloud glossary of the account contains the word entry corresponding to the text information; and
a translation unit configured to translates the text information based on the cloud translation request information when the cloud server account detection unit of the cloud server detects that a mobile terminal does not login to an account with the preset communication type, or when the word entry detection unit detects that a cloud glossary of the account does not contain a word entry corresponding to the text information.

20. The system according to claim 19, further including:
a cloud-glossary-addition prompt unit configured to send a cloud-glossary-addition prompt message to the mobile client through the cloud server information receiving/sending unit when the word entry detection unit detects that the word entry corresponding to the text information is not added to the cloud glossary of the account.

21. The system according to claim 20, wherein:
the cloud server information receiving/sending unit is configured to receive the cloud-glossary-addition request information sent from the mobile client; and
the cloud-glossary-addition unit is configured to store the word entry corresponding to the text information and the corresponding translation result in the cloud glossary corresponding to the account based on the cloud translation request information, where the corresponding translation result is the result translated based on the cloud translation request information or the translation result received from the mobile client.

22. The system according to claim 21, wherein the cloud translation request information further includes:
information on whether the mobile terminal logins to the account with the preset communication type and the account with the preset communication type when the mobile terminal logins to the account with the preset communication type.

* * * * *